United States Patent Office 3,514,415
Patented May 26, 1970

---

3,514,415
AZO POLYMERS AND PREPARATION THEREOF
Frederick J. Karol, Somerset, N.J., assignor to Union Carbide Corporation, a corporation of New York
No Drawing. Continuation-in-part of application Ser. No. 438,740, Mar. 10, 1965. This application Oct. 23, 1965, Ser. No. 504,240
Int. Cl. C08g 33/02, 23/00
U.S. Cl. 260—2
13 Claims

ABSTRACT OF THE DISCLOSURE

Azo polymers capable of resisting exposure to temperatures in excess of 200° C. have been synthesized by contacting at least one diamine having the general formula:

$$H_2N-Ar-Y-Ar-NH_2$$

wherein Ar is an arylene radical and Y is a divalent organic or inorganic radical, with a cuprous salt in the presence of a liquid tertiary amine in which the diamine and cuprous salt are both soluble.

---

This is a continuation-in-part of application Ser. No. 438,740, filed on Mar. 10, 1965 now abandoned.

This invention relates to novel azo polymers and methods of synthesizing them.

Despite the wide acceptance accorded organic polymers as a structural material of commerce, their use has been limited generally to applications where their service temperatures did not exceed about 200° C. There has existed a continuing need for polymers which can be fabricated into useful forms and parts, capable of resisting exposure to temperatures in excess of 200° C. without undergoing degradation.

It has now been discovered that normally solid azo polymers, both homopolymers and copolymers, can be prepared which have a high degree of thermal stability.

The azo homopolymers of this invention can be represented by the following graphical formula:

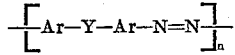

wherein each Ar is an arylene radical having up to 14 carbon atoms, Y is a divalent radical such as —O—, —S—, —(CH$_2$)$_x$—,

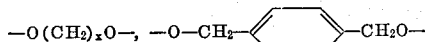

or

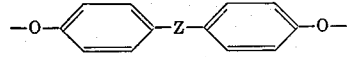

wherein $x$ is an integer having values of about 1 to 20, Z is a divalent radical such as —O—, —S—,

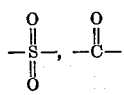

or a hydrocarbon diradical and $n$ is an integer having a value sufficiently high as to provide a normally solid polymer.

The copolymers of this invention can be represented by the following graphical formula:

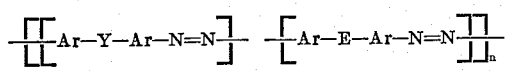

wherein Ar, Y, and $n$ are as defined above and E is selected from the same group as Y with the proviso that Y and E never represent the same divalent radical at the same time.

These azo polymers can be readily synthesized by contacting at least one diamine having the general formula:

$$H_2N-Ar-Y-Ar-NH_2$$

wherein Ar and Y are as described above, with a catalytic amount of a cuprous salt and oxygen in the presence of a liquid tertiary amine in which the diamine and cuprous salt are both soluble.

The cuprous salts of this invention must be capable of existing in the cupric state and of forming a complex with the tertiary amine.

Illustrative of such cuprous salts are cuprous chloride, cuprous bromide, cuprous fluoride, cuprous sulfate, cuprous azide, cuprous tetramine sulfate, cuprous acetate, cuprous propionate, cuprous palmitate, cuprous butyrate, cuprous laurate, cuprous benzoate, and the like.

While the mole ratio of diamine to cuprous salt is not narrowly critical, it is preferred to use ratios of about 3:1 to 260:1.

It is not imperative that pure oxygen be used in the practice of this invention, since air or oxygen diluted with nitrogen, argon or other inert gas can also be employed.

The tertiary amine which serves as a solvent for the diamine reactant can be aliphatic or cyclic. However, it is preferred to employ a cyclic tertiary amine, with pyridine and alkyl substituted pyridines, such as α, β, and γ picolines being particularly preferred.

Examples of other cyclic amines which are suitable as solvents include quinoline, isoquinoline, quinaldine, the N-alkyl tetrahydroquinolines, N-alkyl piperidines, N-alkyl morpholines, and the like.

Examples of suitable aliphatic tertiary amines include trimethylamine, triethylamine, tripropylamine, tributylamine, triisopropylamine, diethylmethylamine, dimethylpropylamine, allyldiethylamine, diioctylbenzylamine, diioctylchlorobenzylamine, dimethylcyclohexylamine, dimethylphenylethylamine, benzylmethylethylamine, di-(chlorophenylethyl)bromobenzylamine, 1-dimethylamine-2-phenylpropane, 1-dimethylamine-4-pentane, and the like.

Temperature is not narrowly critical and is limited mainly by the boiling and freezing points of the tertiary amine selected as the solvent. Thus, with pyridine for example, polymerization of a diamine, falling within the previously described formula, can be effected over a range of about —40 to +115° C. However, for economic reasons ambient temperatures of about 20 to 30° C. are preferred.

It is preferred that some agitation be provided in the polymerization system but the type is not critical. In some cases, the mere bubbling of oxygen or oxygen containing gas into the reaction media will suffice. If desired, agitation means well known in the art such as mechanically driven stirrers, magnetic stirrers, and the like can be employed.

The oxygen or oxygen containing gas mixture can be bubbled into the reaction media, preferably at the bottom of the reactor, through any of the gas dispersion methods commonly used in the art.

Although atmospheric pressures are preferred for reasons of convenience and economy, both superatmospheric and subatmospheric pressures can also be employed, if desired.

When the polymerization reaction is complete, the resultant azo polymer can be recovered by pouring the reaction products into a dilute mineral acid, to deactivate the catalyst, followed by filtration and successive washs of the azo polymer on the filter bed with water, a low molecular weight aliphatic alcohol and a low molecular weight aliphatic ketone. The azo polymer can then be air dried or dried with conventional drying means such as ovens, heating lamps and the like.

Depending upon the nature of the divalent radicals, Ar, E, and Y, in the starting diamines previously described, azo polymers covering a wide spectrum of properties can be produced by the present invention. Thus, for example, starting with a single diamine, oxydianiline (4,4'-diaminodiphenyl ether), an azo homopolymer is obtained which can be heated to 540° C. without melting but which affords brittle films upon heating to 250° C. under a platen pressure of 60 tons. Substituting a Bisphenol-A, i.e., 2,2-(bis-p-hydroxyphenyl)propane radical:

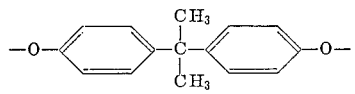

for the O bridge in the starting diamine affords an azo homopolymer which is soluble in o-dichlorobenzene or pyridine and can be pressed or solution cast into a tough flexible film. Other modifications and properties which can be incorporated into these azo polymers will be demonstrated by the examples presented later.

Where Ar is phenylene, the general diamine formula is:

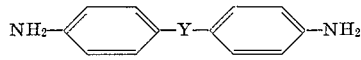

When Y is —S— or

this formula represents bis(4-aminophenyl)-sulfide and bis(4-aminophenyl)sulfone respectively.

When Y is —(CH$_2$)$_x$— some of the diamines represented include: methylenedianiline, ethylenedianiline, polyethylenedianiline, ethylidenedianiline, propylenedianiline, polypropylenedianiline, and the like.

Specific examples of diamines where Y is

include:

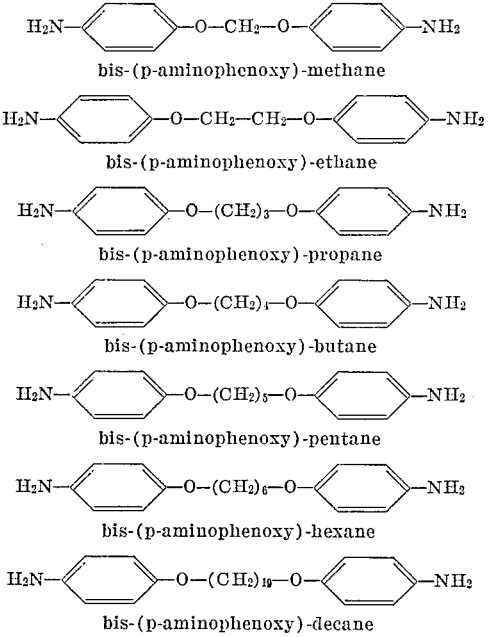

Specific examples of diamines where Y is

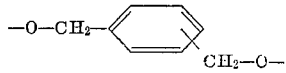

include:

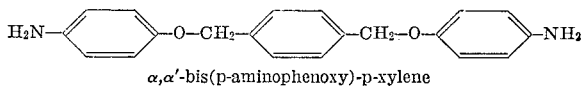
α,α'-bis(p-aminophenoxy)-p-xylene

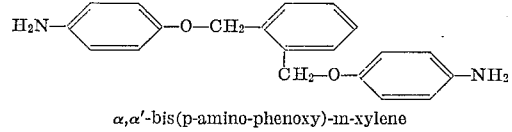
α,α'-bis(p-amino-phenoxy)-m-xylene

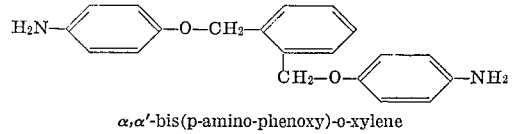
α,α'-bis(p-amino-phenoxy)-o-xylene

Specific examples of diamines where Y is

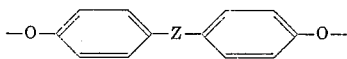

and Z is —O—, —S—,

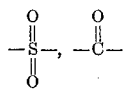

or a hydrocarbon diradical which is either aliphatic or cycloaliphatic include those derived from:

bis(4-hydroxyphenyl)ether
bis(4-hydroxyphenyl)sulfide
bis(4-hydroxyphenyl)sulfone
2-(4-hydroxyphenyl)-2-(4-hydroxy-3-methylphenyl)propane
2,2-bis(4-hydroxy-3-ethylphenyl)propane
2,2-bis(4-hydroxy-3-isopropylphenyl)propane
2,2-bis(4-hydroxy-3,5-dichlorophenyl)propane
2,2-bis(4-hydroxy-3-cyclohexylphenyl)propane
2,2-bis(4-hydroxyphenyl)isopentane
2,2-bis(4-hydroxyphenyl)nonane
bis(4-hydroxyphenyl)methane
1,1-bis(4-hydroxyphenyl)ethane
1,1-bis(4-hydroxyphenyl)butane
1,1-bis(4-hydroxyphenyl)isobutane
2,2-bis(4-hydroxyphenyl)butane
1,1-bis(4-hydroxyphenyl)cyclohexane
1,2-bis(4-hydroxyphenyl)ethane
1,1-bis(4-hydroxyphenyl)cyclopentane
bis(4-hydroxy-3-methylphenyl)propane
2,2-bis(4-hydroxyphenyl)pentane
bis(4-hydroxyphenyl)methylphenylmethane
bis(4-hydroxyphenyl)hexane
4,4-bis(4-hydroxyphenyl)heptane
2,2-bis(4-hydroxy-2,3,5,6-tetrachlorophenyl)propane, and
2,2-bis(4-hydroxy-2,3,5,6-tetrahydrophenyl)propane.

The phenyl groups described above can also be substituted in every available position with hydrocarbon, alkoxy, and carboalkoxy groups having up to about 8 carbon atoms and with any of the halogens, that is, fluorine, chlorine, bromine or iodine. Specific examples of some substituted Y moieties include:

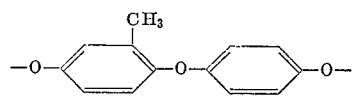

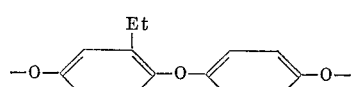

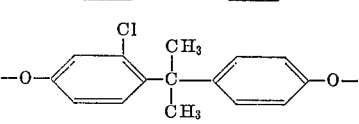

3,514,415

$$-O-\underset{Cl}{\underset{|}{\bigcirc}}-\underset{CH_3}{\overset{CH_3}{\underset{|}{C}}}-\underset{Cl}{\underset{|}{\bigcirc}}-O-$$

$$-O-\underset{CO_2\,Ethyl}{\bigcirc}-S-\bigcirc-O-$$

$$-O-\underset{CO_2\,Ethyl}{\bigcirc}-S-\underset{CO_2\,Ethyl}{\bigcirc}-O-$$

$$O-\underset{CO_2\,Et}{\bigcirc}-S-\underset{Cl}{\bigcirc}-O-$$

$$-O-\underset{Cl\ \ Cl}{\overset{Cl\ \ Cl}{\bigcirc}}-\underset{CH_3}{\overset{CH_3}{\underset{|}{C}}}-\underset{Cl\ \ Cl}{\overset{Cl\ \ Cl}{\bigcirc}}-O-$$

$$-O-\underset{CH_3\ CH_3}{\overset{CH_3\ CH_3\ \ CH_3}{\bigcirc}}-\underset{CH_3}{\overset{CH_3}{\underset{|}{C}}}-\underset{CH_3\ CH_3}{\overset{CH_3\ CH_3}{\bigcirc}}-O-$$

Although it is preferred to use a phenylene radical as the divalent aryl radical —Ar— in the general diamine formula $$H_2N-Ar-Y-Ar-NH_2$$

others can also be used such as those derived from naphthalene, anthracene, phenanthrene, and the like. These aryl radicals can be substituted or unsubstituted with the reservation that at least one position ortho to each amino group remains unsubstituted. Suitable substituents include alkyl groups, alkoxy, and carbalkoxy groups having up to about 8 carbon atoms and halogen groups, i.e., fluoro, chloro, bromo and iodo groups.

Specific examples of alkoxy groups include methoxy, ethoxy, propoxy, and like groups.

The azo polymers of the present invention can be used to fabricate shaped articles such as containers, gears, impeller blades, equipment housings, and the like, as well as self-supporting thermoplastic films, suitable for packaging or decorating, all of which have high softening points and resistance to thermal degradation. These azo polymers can also be used as plastic protective coatings for missiles, high speed aircraft and the like.

The invention is further illustrated by the examples which follow in which all parts and percentages are by weight unless otherwise specified.

Example 1

To a 500 ml. round bottom flask equipped with condenser and magnetic stirrer was added 200 ml. of pyridine and 8 g. (40.0 mmoles) of 4,4'-oxydianiline. Then 1 g. (10.1 mmoles) of cuprous chloride was added. The contents were stirred and oxygen was introduced via a section of tubing extending to the bottom of the flask. Oxygen addition was continued for two hours. The contents were poured into dilute hydrochloric acid, filtered and washed with water and methanol. The yield of the brown insoluble solid was 7.5 g. percent yield 96%.

Analysis.—Calculated for $C_{12}H_8N_2O$ (percent): C, 73.46; H, 4.11; N, 14.28; O, 8.15. Found (percent): C, 73.40; H, 4.57; N, 13.51; O, 8.93.

This analysis is consistent with a polymer having the repeating unit $$-\left[\bigcirc-O-\bigcirc-N=N\right]_n-$$

wherein $n$ denotes the degree of polymerization and has a value sufficiently high as to afford a normally solid polymer. The product was insoluble in common organic solvents as their boiling points. It was somewhat soluble in 36 N sulfuric acid from which it could be recovered by dilution with water. Although there was no visible melting point on heating to 540°, a brittle film of the polymer was obtained by heating to 250° C. and using 60 tons of pressure on the platens of a hydraulic press.

In a similar manner polymers were obtained from methylene dianiline and thiodianiline (4,4'-thiodianiline).

Example 2

Example 1 was repeated but in a one liter round bottom flask using 175 milliomoles of oxydianiline, 25.2 millimoles of cuprous chloride, and 500 ml. of pyridine. The reaction was allowed to proceed overnight under constant addition of oxygen. A 96% yield of the azo polymer described in Example 1 was obtained.

Example 3

Example 2 was repeated with the exception that 270 millimoles of 4,4'methylene dianiline was substituted for the 4,4'-oxydianiline and polymerized in the presence of 40.4 millimoles of cuprous chloride overnight. A 96% yield of an azo polymer was obtained having the structure:

$$-\left[\bigcirc-CH_2-\bigcirc-N=N\right]_n-$$

wherein $n$ has a value sufficiently high as to represent a normally solid polymer.

Example 4

Example 2 was repeated with the exception that 4,4-thiodianiline, 96.2 millimoles was substituted for the 4,4'-oxydianiline and polymerized in the presence of 22.1 millimoles of cuprous chloride overnight. A 94% yield of azo polymer was obtained having the structure:

$$-\left[\bigcirc-S-\bigcirc-N=N\right]_n-$$

wherein $n$ has a value sufficiently high as to represent a normally solid polymer.

Example 5

To a 250 ml. round bottom flask equipped with condenser and magnetic stirrer was added 0.75 g. (3.07 mmoles) of 1,2-bis-(p-aminophenoxy)ethane, M.P. 174–177° C., 150 ml. of pyridine and 0.1 g. (1.01 mmoles) of cuprous chloride. The contents were stirred, oxygen was introduced below the surface of the solution, and reaction allowed to take place for 5 hours. The contents were poured into dilute HCl, washed with water, methanolic sodium hydroxide, boiling water, hot methanol, and finally with boiling acetone.

Yield of brownish-red solid, 0.6 g., percent yield: 81%.

Analysis.—Calculated for $C_{14}H_{12}N_2O_2$ (percent): C, 69.98; H, 5.04; N, 11.66; O, 13.32. Found (percent): C, 67.57; H, 4.78; N, 11.39; O, 14.57.

This analysis is consistent with a polymer having the repeating unit:

$$-\left[\bigcirc-O-CH_2CH_2-O-\bigcirc-N=N\right]_n-$$

wherein $n$ denotes the degree of polymerization and has a value sufficiently high as to afford a normally solid polymer. The product was insoluble in common organic solvents such as acetone, benzene and ether up to their boiling points. It was slightly soluble in 36 N sulfuric acid from which it could be recovered by dilution with water. A brittle film of the polymer was obtained by heating to 165–175° C., using 30 tons of pressure on the hydraulic press platens.

Examples 6–10

Following the procedure of Example 5 similar azo polymers are obtained starting with diamines in which the ethane moiety of bis(p-aminophenoxy)-ethane is replaced by methane, propane, butane, pentane, and hexane moieties.

Example 11

Bis(p-aminophenoxy)-o-xylene was prepared by condensing 35 g. (0.217 mole) of the sodium salt of p-nitrophenol with 29.5 g. (0.112 mole) of o-xylene dibromide at 40° C. followed by catalytic reduction with iron and hydrochloric acid. This product had a melting point of 98–99° C.

Example 12

The bis(p-aminophenoxy)-o-xylene prepared in Example 11 (1.87 g., 5.83 millimoles) was placed in a 2 50 ml. round-bottom flask equipped with a condenser, gas inlet tube, and magnetic stirrer together with 150 ml. of pyridine and 0.10 g. (1.01 millimoles) of cuprous chloride. The contents of the flask were stirred at ambient temperatures while oxygen was introduced through the gas inlet tube below the surface of the solution. After 5 hours the contents of the flask were poured into a one liter beaker containing 300 ml. of dilute (0.1 N) hydrochloric acid. The solid product obtained was filtered on a Buchner funnel and washed successively with water, methanol, and acetone. A yield of 1.65 g. (90% of a brown, solid, azo polymer having the structure

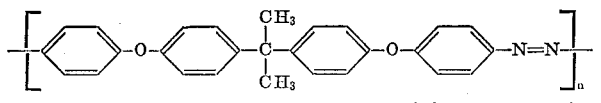

was obtained where $n$ has a value sufficiently high as to afford a normally solid polymer. This polymer softens at about 250° C. at which temperature a dark brown, brittle film can be pressed.

Example 13

The bis(p-aminophenoxy) m- and p-xylenes can also be made and polymerized to azo polymers having properties similar to that obtained from the o-xylene isomer described in Example 12.

Example 14

The preparation of 4,4'-bis(p-aminophenoxy)-2,2-diphenyl propane

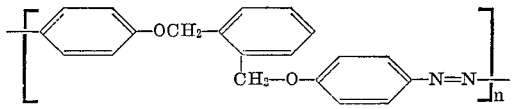

can be effected by reacting 100 g. (0.44 mole) of bisphenol-A, 2,2'-bis(p-hydroxyphenyl)propane, with 35.48 gms. of sodium hydroxide (98.9%) and then with 138 g. (0.88 mole) of p-chloronitrobenzene in dimethyl sulfoxide at 130–160° C. for 2 hours, followed by catalytic hydrogenation with palladium on charcoal.

Examples 15–17

The diamine prepared as described in Example 14 (2.68 g., 6.54 millimoles) was added to 250 ml. of pyridine contained in a 500 ml. round-bottom flask equipped with a condenser, gas inlet tube and magnetic stirrer. After the addition of 0.1 g. (1.01 millimoles) of cuprous chloride, the contents of the flask were stirred for 5 hours at ambient temperature while bubbling oxygen through the solution. The contents of the flask were then poured into a 1 liter beaker containing dilute hydrochloric acid (0.1 N) and the solid product filtered on a Buchner funnel and successively washed with water, methanol, and acetone. The yield of yellow-brown solid was 2.61 g. (98%). This product represented by the formula

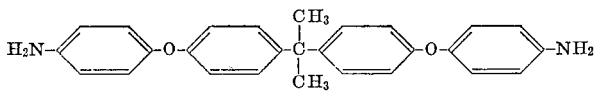

is soluble in o-dichlorobenzene or pyridine and can be precipitated from solution with ethanol. Its reduced viscosity at 25° C. (0.05 g. in 25 ml. of o-dichlorobenzene) was 0.97. Tough films of this polymer can be pressed at 230–300° C. and were also obtainable by film casting from o-dichlorobenzene.

Other azo polymers prepared from the diamine described in Example 14 have been prepared with reduced viscosities ranging from 0. 25 to 3.39 (o-dichlorobenzene, 0.2% solution at 25° C.).

By using the technique described in Example 14 with 2,4'-dihydroxy-2,2-diphenylpropane or 2,2'-dihydroxy-2,2-diphenylpropane, diamines are produced which when polymerized as in Example 15 afford polymers having the respective structures as shown below.

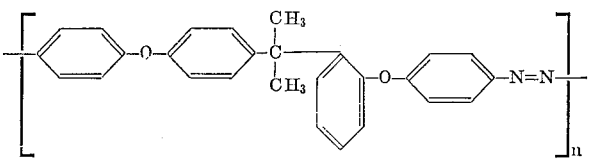

and

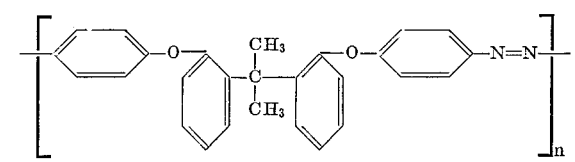

wherein $n$ has a value sufficiently high as to represent a normally solid azo polymer.

Examples 18–19

The procedure described in Example 15 when followed with 4,4'-bis(p-aminophenoxy)-diphenyl ether.

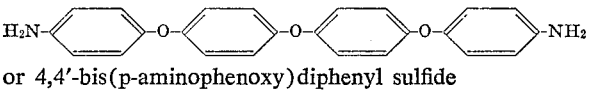

or 4,4'-bis(p-aminophenoxy)diphenyl sulfide

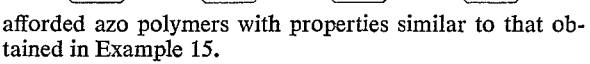

afforded azo polymers with properties similar to that obtained in Example 15.

Example 20

Substitution of cuprous fluoride, bromide, azide, sulfate, tetramine sulfate, acetate or benzoate for cuprous chloride in the procedure described in Example 15 affords similar azo polymers.

Example 21

The procedure described in Example 2 was repeated with the exception that 6.54 millimoles of 4,4'-bis(p-amino-phenoxy)-diphenyl sulfone having the formula

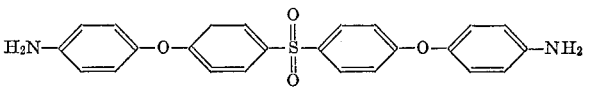

was substituted for the 4,4'-oxydianiline and polymerized with 1.01 millimoles of cuprous chloride in 500 ml. of pyridine for 16 hours. An 89% yield of an azo polymer was obtained having a reduced viscosity (0.2 g. in 100 ml. of pyridine at 25° C.) of 0.39 and the structure:

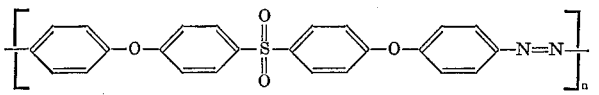

wherein $n$ denotes the degree of polymerization and has a value sufficiently high as to afford a normally solid polymer.

Example 22

The procedure described in Example 2 was repeated with the exception that a diamine mixture of 3.24 millimoles each of 4,4'-bis(p-aminophenoxy)2,2-diphenylpropane and 4,4'-diaminobibenzyl was substituted for the 4,4'-oxydianiline and copolymerized with 1.01 millimoles of cuprous chloride for 5 hours. A 97% yield of azo copolymer was obtained having a reduced viscosity of 0.48 (0.2 g. in 100 ml. of o-dichlorobenzene at 25° C.) and the structure:

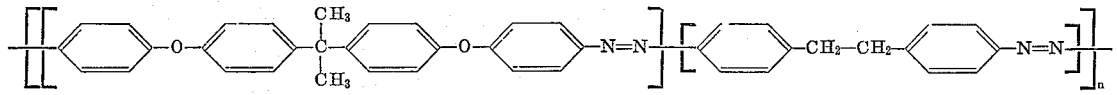

wherein $n$ denotes the degree of polymerization and has a value sufficiently high as to afford a normally solid copolymer.

Although the invention has been described in its preferred forms with a certain degree of particularity, it is understood that the present disclosure has been made only by way of example, and that numerous changes can be made without departing from the spirit and scope of the invention.

What is claimed is:

1. A normally solid azo polymer consisting essentially of repeating units having the structure:

wherein each of Ar is an arylene radical having up to 14 carbon atoms and Y is a divalent radical selected from the group consisting of —O—, —S—, —(CH$_2$)$_x$—, —O(CH$_2$)$_x$O—, and

wherein $x$ is an integer having values of about 1 to 20.

2. The azo polymer claimed in claim 1 wherein Ar is a phenylene radical and Y is —O(CH$_2$)$_x$O—.
3. The polymer claimed in claim 1 wherein Ar is a phenylene radical and Y is —(CH$_2$)$_x$—.
4. The polymer claimed in claim 1 wherein Ar is a phenylene radical and Y is —S—.
5. The polymer claimed in claim 1 wherein Ar is a phenylene radical and Y is —O—.
6. The polymer claimed in claim 1 wherein Ar is a phenylene radical and Y is

7. A normally solid azo copolymer consisting essentially of repeating units having the structure

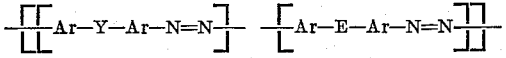

wherein Ar, Y and N are as defined in claim 1 and E is selected from the same group as Y with the proviso that Y and E never represent the same divalent radical at the same time.

8. Method of preparing normally solid azo polymers which comprises contacting (a) at least one aromatic amine having the structure:

H$_2$N—Ar—Y—Ar—NH$_2$ wherein Ar is an arylene radical having up to 14 carbon atoms, and Y is a divalent radical selected from the group consisting of —O—, —S—, —(CH$_2$)$_x$O—,

and

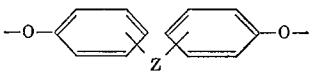

wherein $x$ is an integer having values of about 1 to 20, and Z is a divalent radical selected from the group consisting of —O—, —S—,

and saturated aliphatic and cycloaliphatic hydrocarbon diradicals having up to about 10 carbon atoms; with (b) a catalytic amount of a cuprous salt, capable of existing in the cupric state and complexing with tertiary amines; and
(c) an oxygen containing gas, in the presence of a liquid tertiary amine in which said aromatic diamine and cuprous salt are soluble, for a period of time sufficient to afford normally solid azo polymers.

9. Method claimed in claim 8 in which the Ar is phenylene,

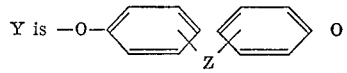

Z is an isopropylidene radical, and the cuprous salt is cuprous chloride.

10. Method claimed in claim 8 wherein the oxygen containing gas is air.
11. Method claimed in claim 8 wherein the tertiary amine is pyridine.
12. Method claimed in claim 8 wherein the azo polymer is recovered by contacting the reaction mixture with hydrochloric acid.
13. Method claimed in claim 8 wherein the oxygen containing gas is continuously bubbled through the reactants in an agitated reactor.

References Cited

FOREIGN PATENTS 907,105   10/1962   Great Britain.
142,426   3/1961   U.S.S.R.

OTHER REFERENCES

Kotlyarevskii et al.: Izv. Akad. Nauk SSSR, Ser. Khim., 1964, pp. 1854–60 (Chem. Abstracts, vol. 62, col 6571).

Carlton et al.: The Journal of Physical Chemistry, vol. 68, No. 9, pp. 2261–65, September 1964.

Liogon'kii et al.: 59 Chem. Abstracts 4054 (1963).

SAMUEL H. BLECH, Primary Examiner

U.S. Cl. X.R.

260—47, 49, 79, 571